(12) United States Patent
Yamamoto

(10) Patent No.: US 6,367,489 B1
(45) Date of Patent: Apr. 9, 2002

(54) BRAKE WASHER

(76) Inventor: Soichiro Yamamoto, 2 Allen Manner, Unionville, Ontario (CA), L6C 1B2

(*) Notice: Subject to any disclaimer, the term of this patent is extended or adjusted under 35 U.S.C. 154(b) by 0 days.

(21) Appl. No.: 09/526,944

(22) Filed: Mar. 16, 2000

(51) Int. Cl.$^7$ ................................ B60S 3/00; B08B 3/02
(52) U.S. Cl. ..................... 134/95.2; 134/95.3; 134/123; 134/172
(58) Field of Search ............................... 134/95.2, 95.3, 134/104.2, 111, 123, 172

(56) References Cited

U.S. PATENT DOCUMENTS

| | | | |
|---|---|---|---|
| 2,385,393 A | * 9/1945 | Wilson | 134/111 X |
| 2,627,862 A | * 2/1953 | Hoerner | 134/111 X |
| 3,133,306 A | * 5/1964 | Pitts | 134/123 X |
| 4,791,947 A | * 12/1988 | Holzberger | 134/172 X |

OTHER PUBLICATIONS

KleenTec catalogue –p. 10.
Goodall Mfg Catalogue—p. 32, publication date 1999.

* cited by examiner

Primary Examiner—Philip Coe
(74) Attorney, Agent, or Firm—Cummings & Lockwood

(57) ABSTRACT

Apparatus for cleaning and servicing vehicle brakes includes a caster mounted cabinet adapted to hold a small drum of cleaning solvent, the drum having an open top. A telescopic post or conduit extends upwardly from the cabinet to a hollow, hinged swing arm. A sink tray is mounted on the end of the swing arm and has a bottom drain opening that communicates with the hollow swing arm, which in turn communicates with the upright conduit to form drain piping for the sink tray. The outlet of the upright conduit empties into the solvent container in the cabinet. A pump mounted in the cabinet takes cleaning solvent from the drum and delivers it through a hose to a spray gun to be applied to the brakes to be cleaned. The telescoping post and adjustable swing arm allow the sink tray to be located directly under the brakes being cleaned to catch and return the used solvent. The cabinet also has a second basin or sink that drains into the container but can be used for cleaning parts.

22 Claims, 13 Drawing Sheets

BRAKE WASHER

FIELD OF THE INVENTION

This invention relates to parts washers, and in particular, to machines for cleaning vehicle brakes, usually with the brakes still mounted on the vehicle.

BACKGROUND OF THE ART

In the course of servicing the brakes on a vehicle, such as an automobile, it is often desirable to clean the brake components, such as the drums, shoes or calipers and pads, cylinders, etc. Further, it is desirable to be able to do this without disassembling or removing the brakes from the vehicle. In order to do this, machines have been developed that have wheels or casters so that they can be rolled into position. These machines have a reservoir for containing solvent or water-based cleaners. A pump is included to pump the solvent from the reservoir through an extendable hose to a spray gun or flow-through brush for applying the cleaning fluid to the brake components. The used cleaning fluid then drips or falls downwardly to be caught by a large sink or basin located under the brake assembly and mounted on the machine. The sink then drains back to the reservoir.

A difficulty with the prior art brake washer machines stems from the fact that the vehicles are usually hoisted into the air to service the brakes. If the hoisting apparatus does not get in the way to prevent the parts washing machine from being positioned under the brakes to catch the cleaning fluid, then at least part of the hoisting apparatus blocks or diverts the flow of cleaning fluid coming from the brakes to the parts washer sink or basin. The result is that solvent is spilled and wasted. This also is an environmental hazard.

The present invention provides a brake washer with a sink tray that is mounted on a telescoping swing arm, so that the tray can be positioned right directly underneath the brake assembly being cleaned, thus avoiding spillage.

SUMMARY OF THE INVENTION

According to the invention, there is provided a brake cleaning apparatus comprising a base adapted to hold a container of cleaning fluid, the container having a top opening. An upright conduit is telescopically mounted in the base. The conduit has a lower outlet end portion adapted to communicate with the container opening, and a top inlet end portion. A hollow swing arm is attached to the conduit top inlet end portion to communicate therewith. The swing arm has a distal end portion defining an inlet opening. A tray is provided having a sump portion defining an outlet opening. The tray is mounted on the swing arm distal inlet end portion with the tray outlet opening in communication with the swing arm inlet opening. A pump is mounted on the base and has an inlet adapted to communicate with cleaning fluid in the container. The pump also has an outlet. A cleaning fluid hose is coupled to the pump outlet and has an outlet end adapted to extend above the tray. Also, means are provided for activating the pump to supply cleaning fluid to the hose.

BRIEF DESCRIPTION OF THE DRAWINGS

Preferred embodiments of the invention will now be described, by way of the accompanying drawings, in which.

DESCRIPTION OF THE PREFERRED EMBODIMENTS

Figure 1:
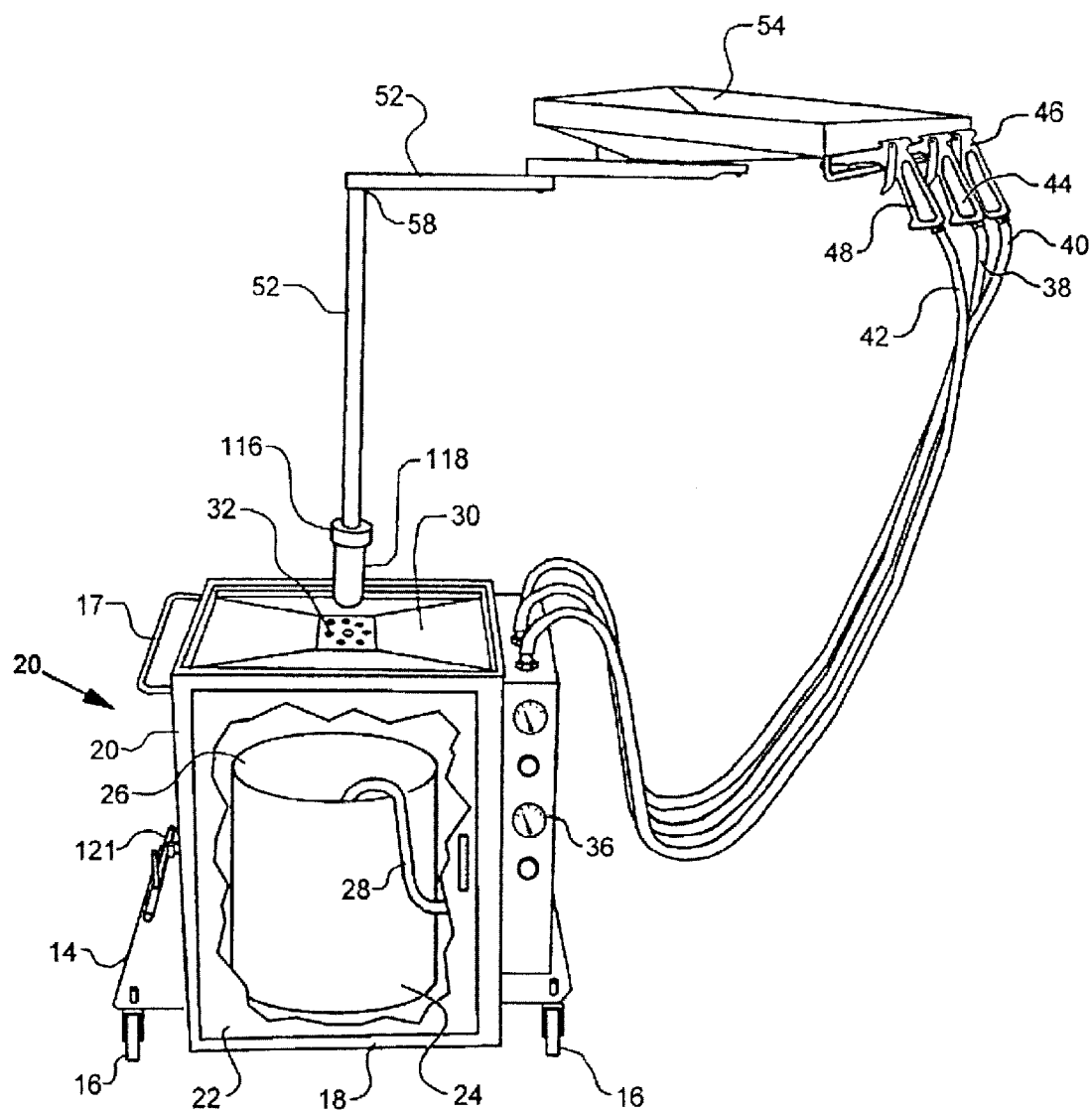
FIG. 1 is front perspective view, partly broken away, taken from above showing a preferred embodiment of a brake cleaning apparatus according to the present invention.
Figure 2:
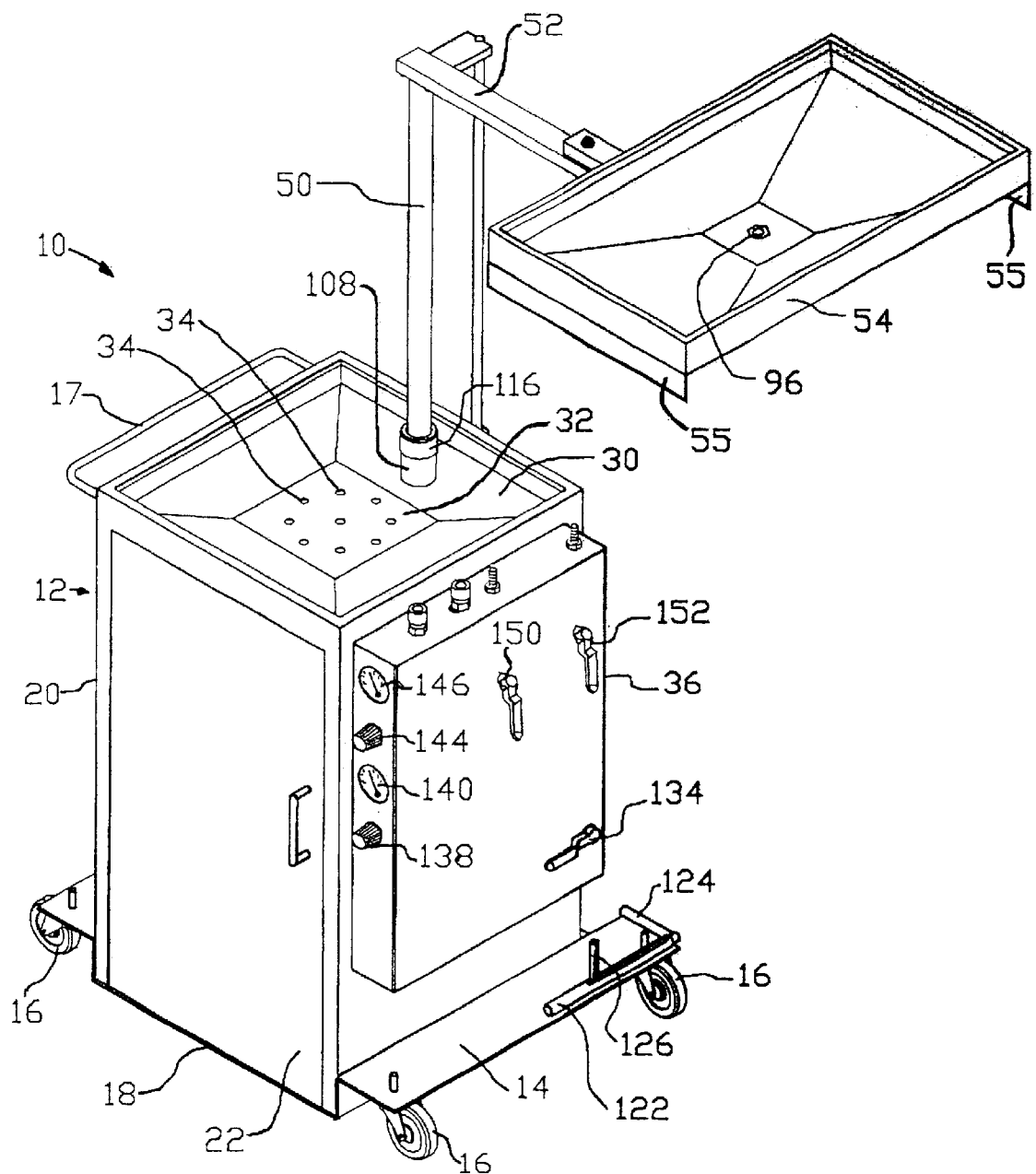
FIG. 2 is a perspective view taken from the front and the right side showing the apparatus of FIG. 1 with the cleaning fluid and air hoses removed.
Figure 3:
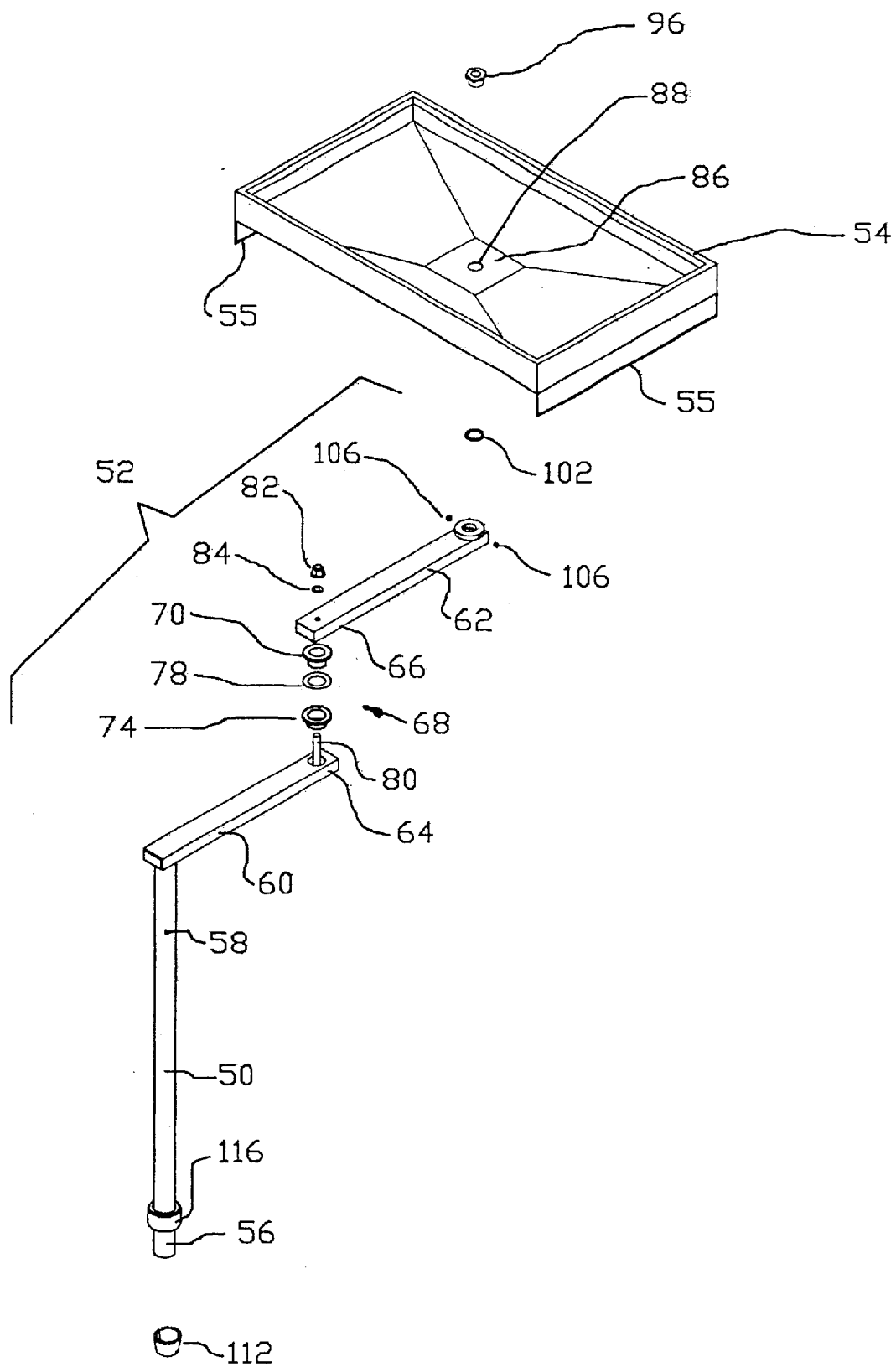
FIG. 3 is an exploded perspective view of the upright conduit, swing arm and tray assembly of the apparatus shown in FIG. 1.
Figure 4:
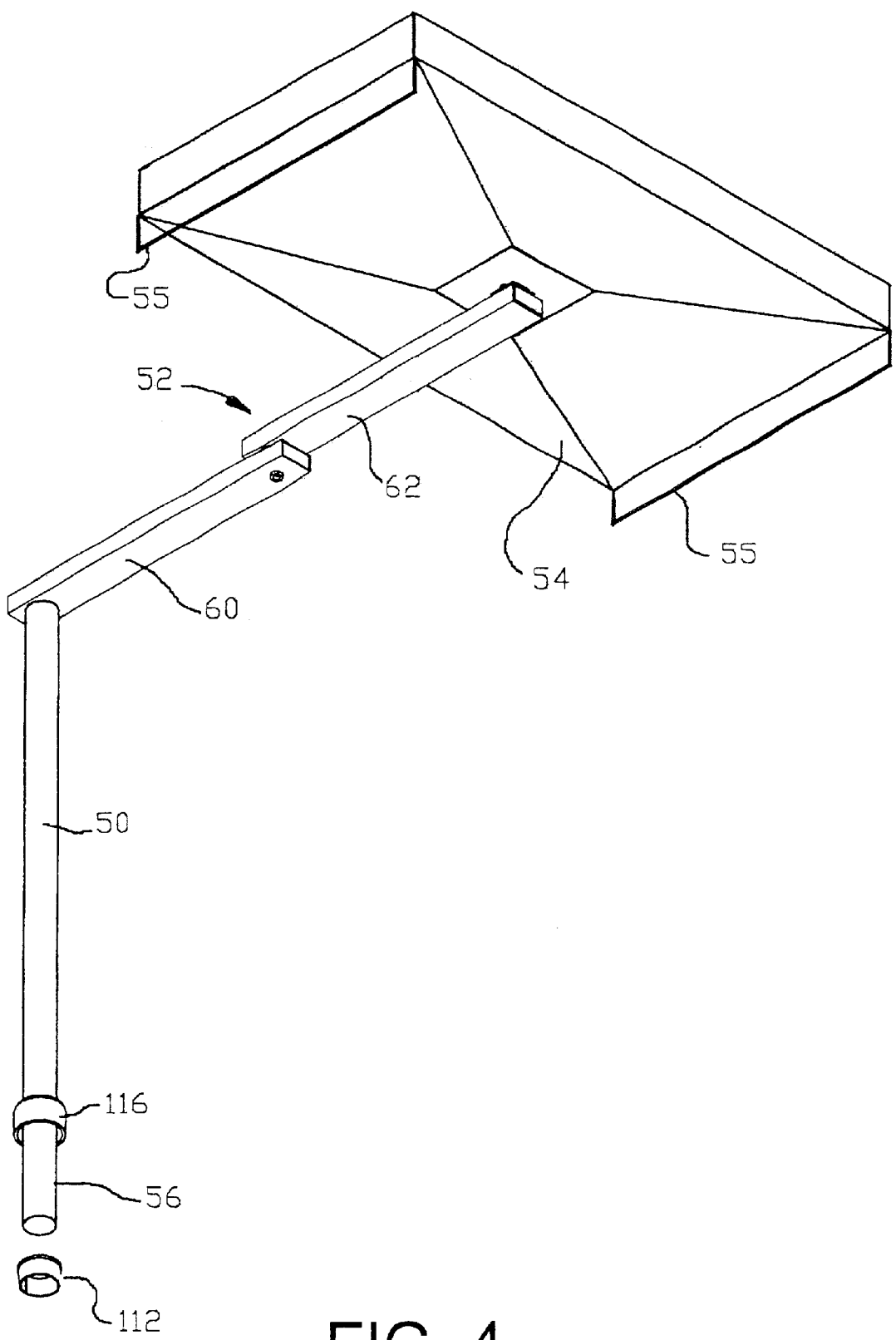
FIG. 4 is a perspective view from below of the assembled apparatus shown in FIG. 3.
Figures 5, 6:
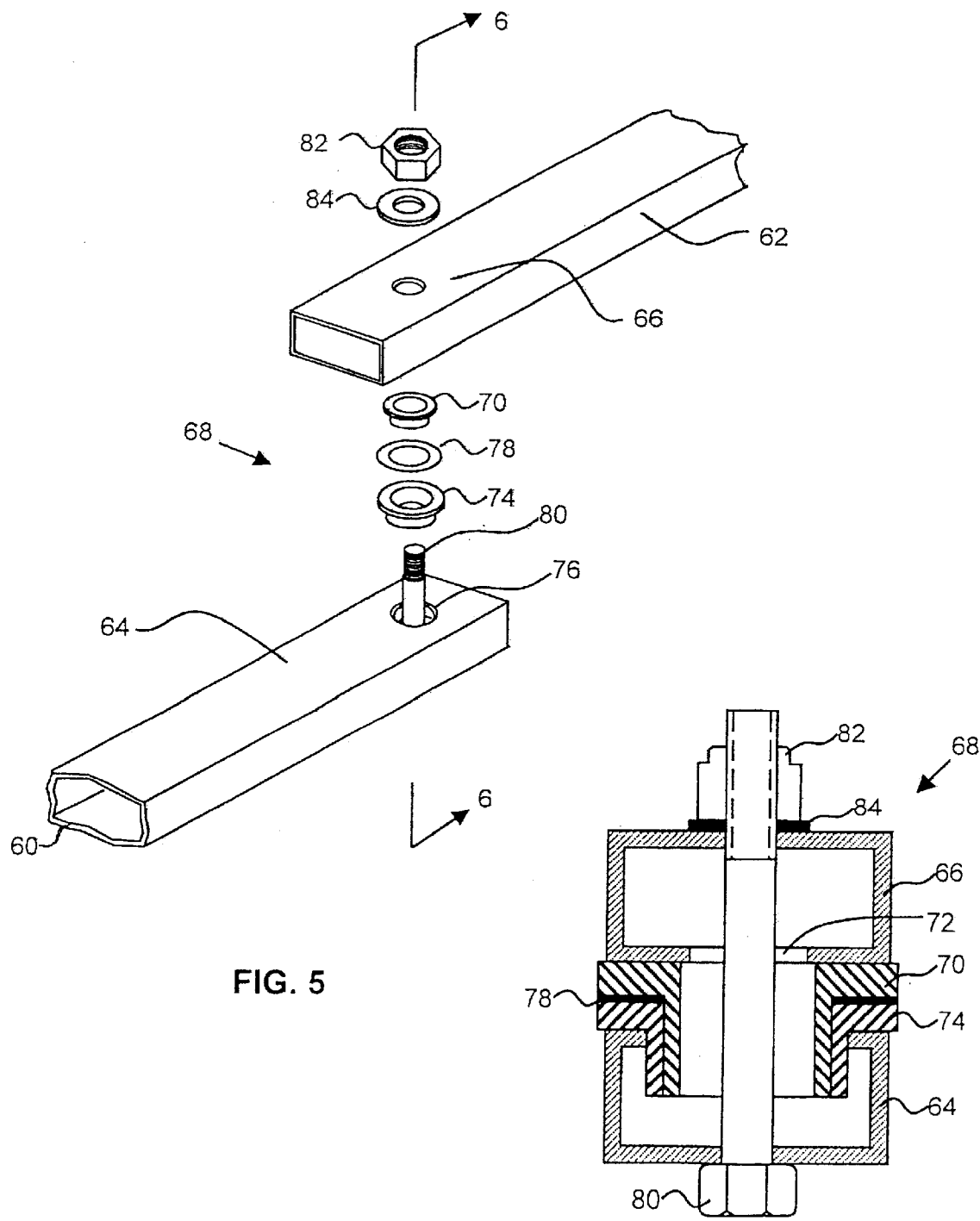
FIG. 5 is an exploded perspective view of the fluid-tight coupling forming the hinged joint of the swing arm shown in FIGS. 1 to 4.
FIG. 6 is a vertical sectional view taken along lines 6—6 of FIG. 5, but showing the assembled coupling.

Referring firstly to FIGS. 1 and 2, a preferred embodiment of a brake washer apparatus according to the present invention is generally indicated by reference numeral 10. Washer apparatus 10 includes a base or cabinet 12. Base cabinet 12 includes a lower dolly 14 having locking casters 16 mounted at the corners thereof to make washer apparatus 10 portable, or at least movable. A handle 17 is provided to facilitate the movement of washer 10. It will be noted that dolly 14 has a lowered center portion 18 on which is mounted a cabinet portion 20. This lowers the center of gravity of the base or cabinet assembly 12. Cabinet portion 20 has a front access door 22, so that cabinet portion 20 can house a removable container or drum 24. Container 24 typically holds 50 to 60 liters of cleaning fluid and has an open top, or at least a top opening 26 for removing and returning cleaning fluid to container 24. Alternatively, container 26 could have a closed top with access openings for the supply and return of cleaning fluid from and to the container. FIG. 1 shows a pump inlet tube 28 extending into container or tank 24 to withdraw cleaning fluid therefrom, as will be described further below.

Base 12 also has a sink or basin 30 mounted in the top of cabinet portion 20. Basin 30 has a lower sump portion 32 with openings 34 formed therein to provide an outlet for fluid in basin 30 to pass downwardly back into container 24. Sink or basin 30 can be used for washing loose parts in washer apparatus 10.

Base cabinet 12 also includes a side housing 36 which contains the plumbing apparatus, valves, gauges and pump for operating washer apparatus 10, as will be described further below in connection with FIG. 11. It will note from FIG. 1, however, that two solvent hoses 38 and 40 and one compressed air hose 42 extend from side housing 36 to respective spray guns 44, 46 and air gun 48. Spray guns 44, 46 are described further below in connection with FIG. 14, and air gun 48 can be a conventional, trigger-operated air blow gun.

Washer apparatus 10 also has an upright conduit 50 telescopically mounted in cabinet base 12. A hinged or pivoting swing arm 52 is mounted on top of upright conduit 50, and a swivelling or rotatable tray 54 is mounted on the end of swing arm 52. Tray 54 has handles 55 to facilitate the gripping and rotation of the tray as well as the swing arm assembly 52. The assembly formed of upright conduit 50, swing arm 52 and tray 54 is described further below in connection with FIGS. 3 to 9.

Referring next to FIGS. 3 to 6, upright conduit 50 has a lower outlet end portion 56 and a top inlet end portion 58. Swing arm 52 is formed of at least two hollow conduits 60, 62 located end-to-end with adjacent intermediate end portions 64, 66. As seen best in FIGS. 5 and 6, a fluid-tight coupling or hinge joint 68 hingeably connects together the respective adjacent conduit intermediate end portions 64, 66. Coupling 68 includes an upper bushing 70 fastened to the underside of conduit end portion 66. Intermediate end portion 66 is formed with an opening 72 formed therein for the flow of cleaning fluid from hollow conduit 62 down through bushing 70. A lower bushing 74 is mounted in an opening 76 formed in the top surface of intermediate end portion 64. A washer 78 formed of nylon or some other suitable plastic or other sealing material is located between bushings 70, 74 to make coupling 68 fluid tight. Coupling 68 is held together by bolt 80, lock nut 82 and washer 84. Bolt and nut 80, 82 are tightened just sufficiently to provide a good seal between bushings 70, 74 and so that coupling 68 can hold the swing arm conduits 60, 62 in position, yet allow the swing arm conduits 60, 62 to be pivoted about the axis of bolt 80.

Swing arm hollow conduit 60 is normally rigidly attached to upright conduit top inlet end portion 58, yet swing arm 52 rotates or pivots about the axis of upright conduit 50 because conduit 50 is rotatably and slidably mounted in base cabinet 12, as will be described further below. However, swing arm conduit 60 could be pivotally or rotatably attached to upright conduit 50, if desired.

Figure 7:
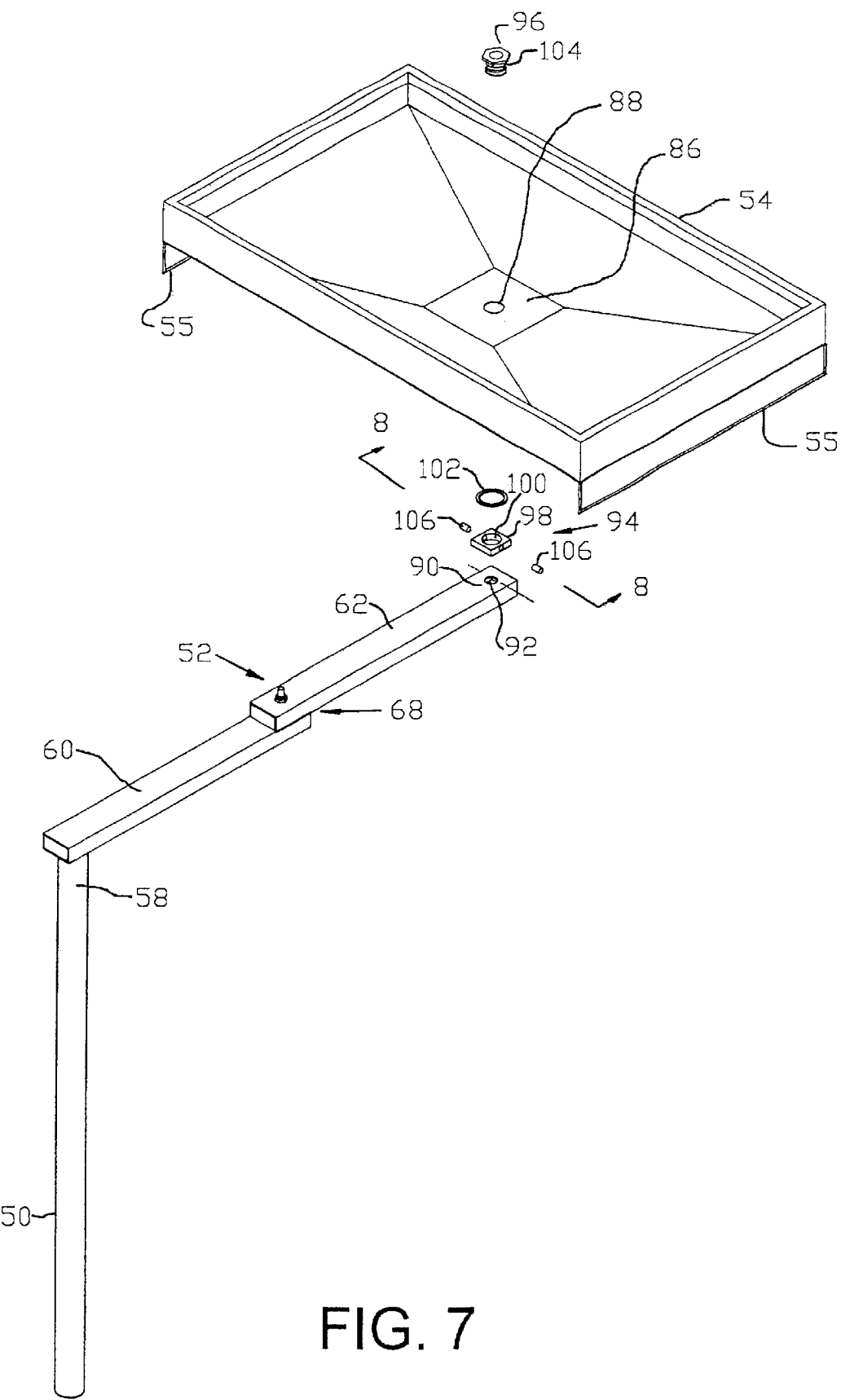
FIG. 7 is an enlarged, exploded, perspective view showing the rotatable coupling joining the tray to the swing arm.
Figure 8:
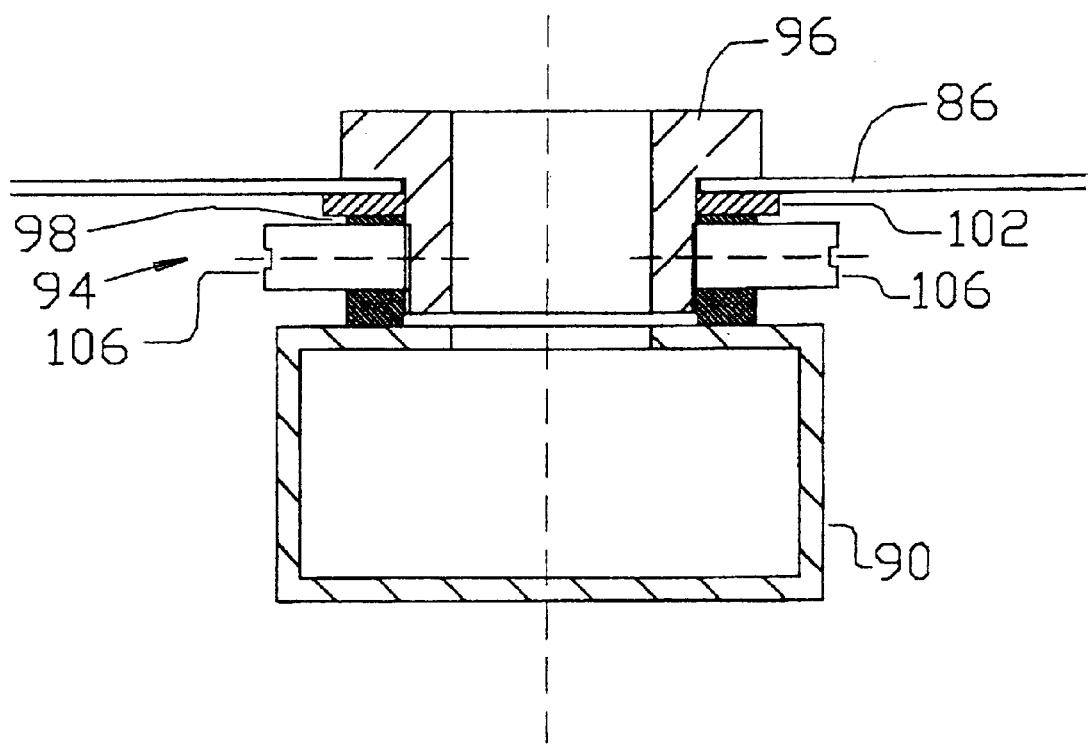
FIG. 8 is a sectional view taken along lines 8—8 of FIG. 7 showing the assembled rotatable coupling.

Referring next to FIGS. 7 and 8, tray 54 has a sump portion 86 defining an outlet opening 88. Swing arm conduit 62 has a distal end portion 90 defining an inlet opening 92 therein. Tray 54 is rotatably coupled to swing arm conduit 62 by another rotatable, fluid-tight coupling 94 connecting tray sump portion 86 to swing arm distal end portion 90. Fluid-tight coupling 94 includes an upper bushing 96 rigidly mounted in opening 88 of sump portion 86. A lower collar 98 is rigidly attached to distal end portion 90. Collar 98 has a central opening 100 therethrough to accommodate rotatably bushing 96 therein. A nylon washer 102 is located between the underside of sump portion 86 and collar 98. Bushing 96 has an annular groove 104 formed therein, and set screws 106 extend into annular groove 104 to prevent bushing 96 from coming out of collar 98. It will be appreciated that set screws 106 are left loose to allow tray 54 to rotate or pivot. However, set screws 106 could be tightened up to hold tray 54 in a specific position. If desired, set screws 106 could be replaced with thumb screws. With tray 54 mounted on swing arm 52 in this way, the tray outlet opening 88 is in communication with the swing arm inlet opening 92. Cleaning fluid thus falling into tray 54 passes into swing arm 52 through fluid coupling 94. The fluid then flows down through upright conduit 50 to exit through lower outlet end portion 56 and go into container 24. Swing arm 52 has a slight downward slope from tray 54 toward upright conduit 50 to facilitate the flow of cleaning fluid through swing arm 52. Also, bushings 70, 74 and collar 98 can be welded in place at a slight angle, so that their axes remain vertical to keep tray 54 level and swing arm hollow conduit 62 slightly angled downwardly even where conduit 62 is swung rearwardly or back toward hollow conduit 60.

Figure 9:
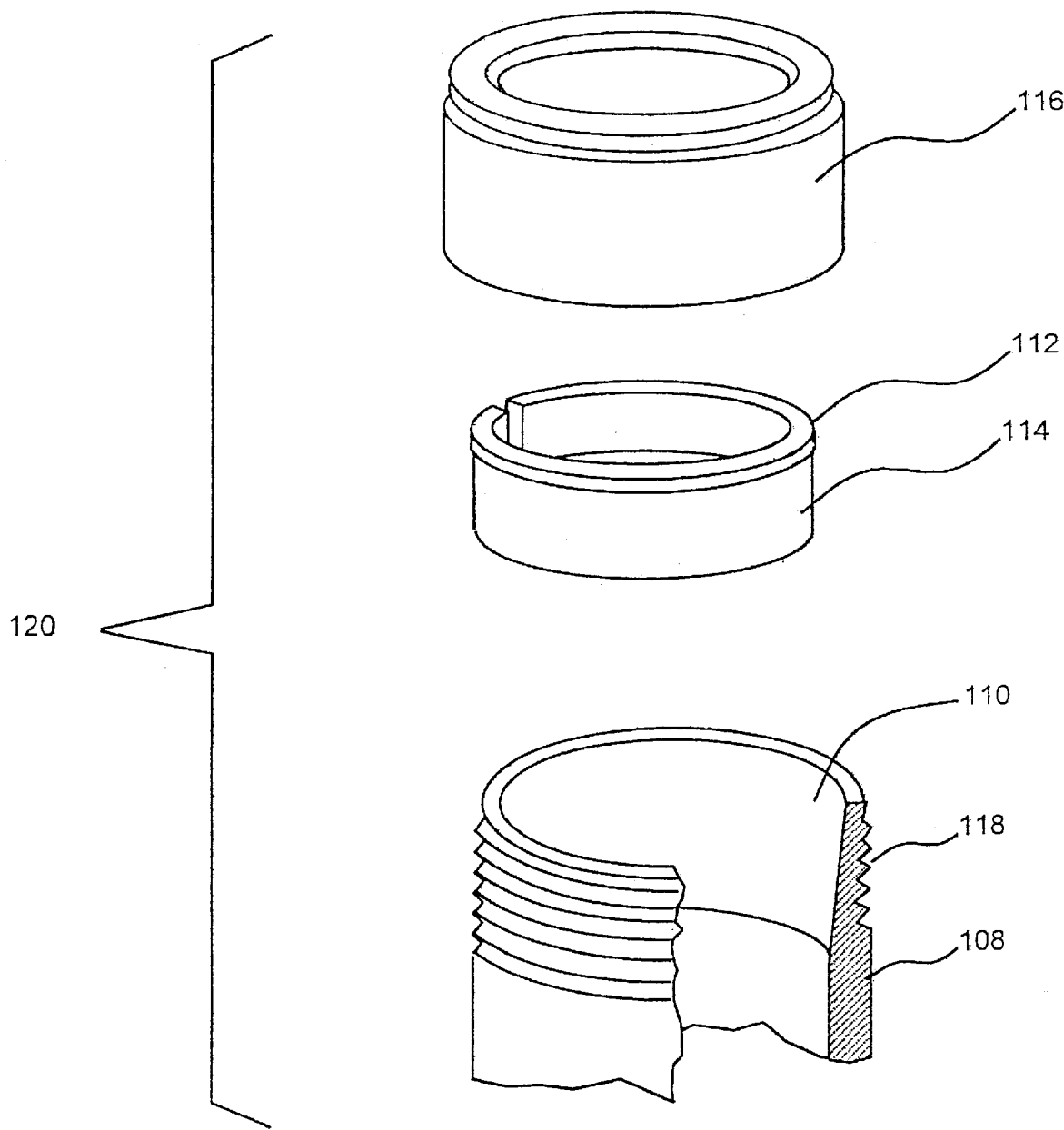
FIG. 9 is an exploded perspective view, partly broken away, of the friction clutch used to lock the telescoping upright conduit into position.

Referring next to FIGS. 1, 2 and 9, base cabinet 12 has a collar 108 rigidly mounted therein to slidably and rotatably accommodate upright conduit 50. As seen best in FIG. 9, collar 108 has a tapered upper inner wall portion 110. A split friction sleeve 112 having a tapered outer wall 114 engages tapered inner wall portion 110. A compression nut 116 is threaded onto threads 118 of collar 108, so that tightening of compression nut 116 causes friction sleeve 112 to be squeezed inwardly to grip upright conduit 50 to prevent it from rotating or sliding axially in collar 108. Collar 108, friction sleeve 112 and compression nut 116 form a friction clutch 120 for releasably locking upright conduit 50 in position. Collar 108 and conduit lower outlet end portion can 56 be considered to be telescopic portions of conduit 50 for the purposes of the present specification.

Figure 10:
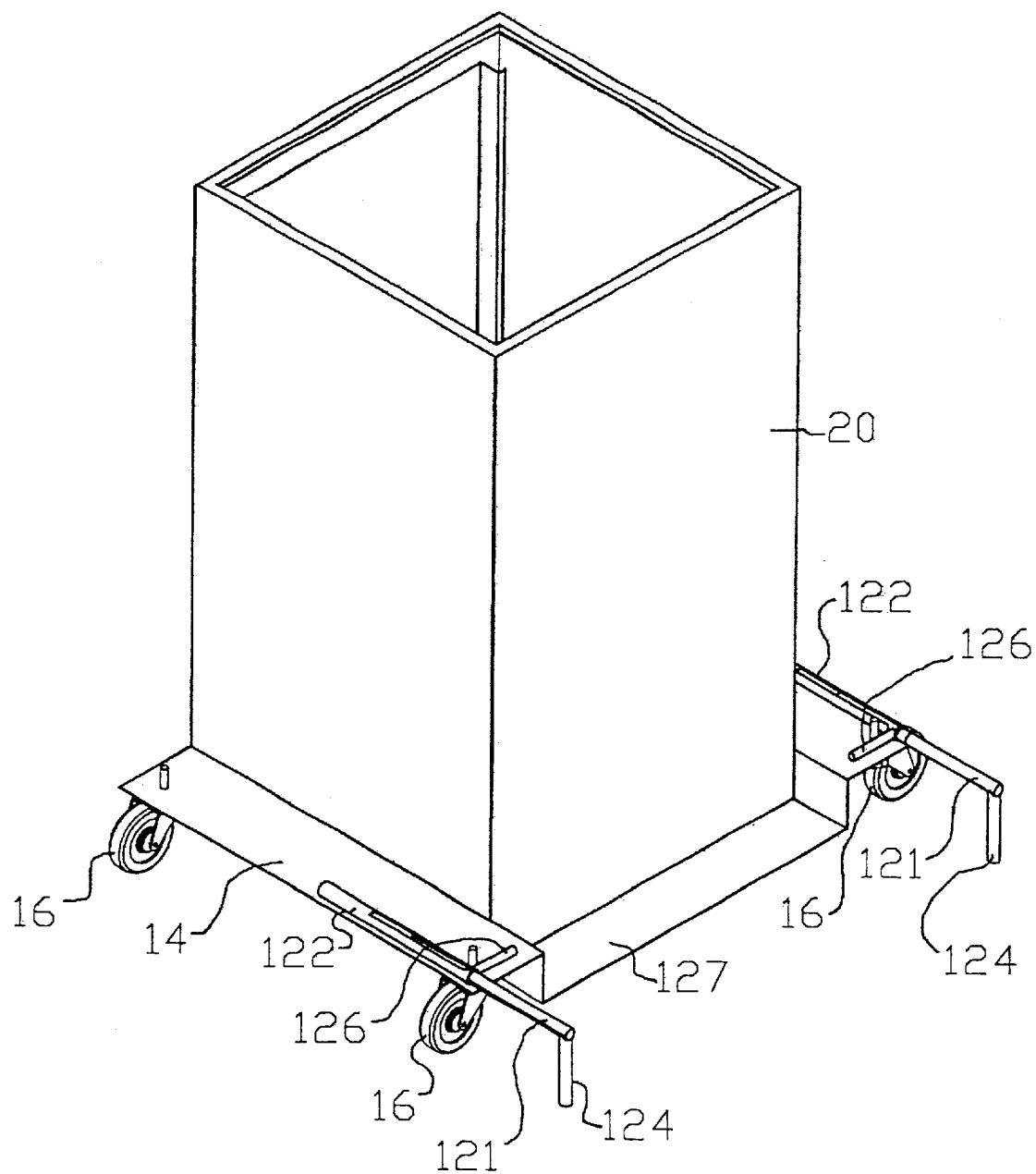
FIG. 10 is a perspective view of a portion of the cabinet showing the stabilizers extended to prevent tipping.

A seen best in FIG. 10, dolly 14 has a pair of stabilizer bars 121 slidably mounted in tubes 122. Stabilizer bars 120 have transverse end portions 124 which engage the ground to help prevent the washing apparatus from tipping. Transverse handles 126 are also provided to extend and retract stabilizer bars 120 and also to retain the bars in the extended position. It will be appreciated that by rotating handles 126 into a vertical position as seen best in FIG. 2, the stabilizer bars can be retracted into tubes 122. It will also be noted in FIG. 10 that dolly 14 has an extended rear portion 127, again to augment the stability of parts washer 10 by moving the rear casters further outwardly from the center of gravity of parts washer 10.

Figure 11:
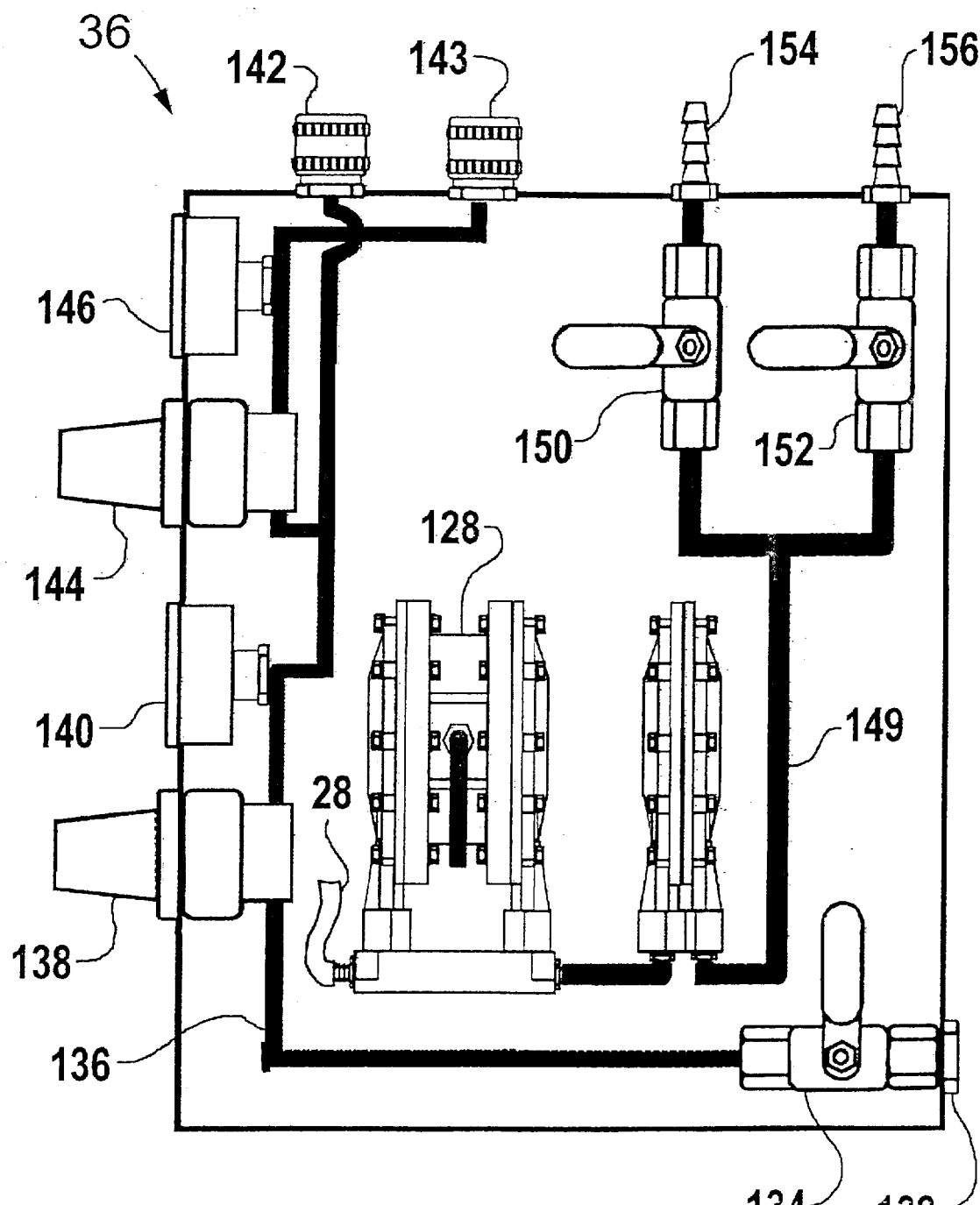
FIG. 11 is a diagrammatic view showing a pump and valve apparatus of the embodiment shown in FIGS. 1 and 2.

Referring next to FIGS. 1, 2 and 11, side housing 36 contains a cleaning fluid pump 128 and a pressure damper 130. A quick-connect compressed air inlet fitting or coupling 132 is connected to an inlet ball valve 134 to supply compressed air to pump 128. Air lines 136 also supply compressed air through a regulator 138 and pressure gauge 140 to a quick connect outlet coupler or coupling 142, which can be used for accessory air tools. Compressed air is also supplied through another regulator 144 and pressure gauge 146 to quick-connect outlet coupler 148, which in turn is connected or coupled to compressed air hose 42 (see FIG. 1). It will be appreciated that couplings 132, 142 and 148 are in fluid communication with each other.

Cleaning fluid coming from pump 128 is supplied through fluid lines 149 to flow-control ball valves 150, 152, and from the ball valves to hose barbs 154, 156. Solvent hoses 38, 40 (see FIG. 1) are connected to hose barbs 154, 156, but quick-connect couplers could be used for this purpose as well, if desired. It will be appreciated that valves 150, 152 allow the flow to be adjusted individually for spray guns 44, 46.

Pump 128 could be any type of pump and it could be an electric pump instead of an air pump, if desired.

Figure 12:
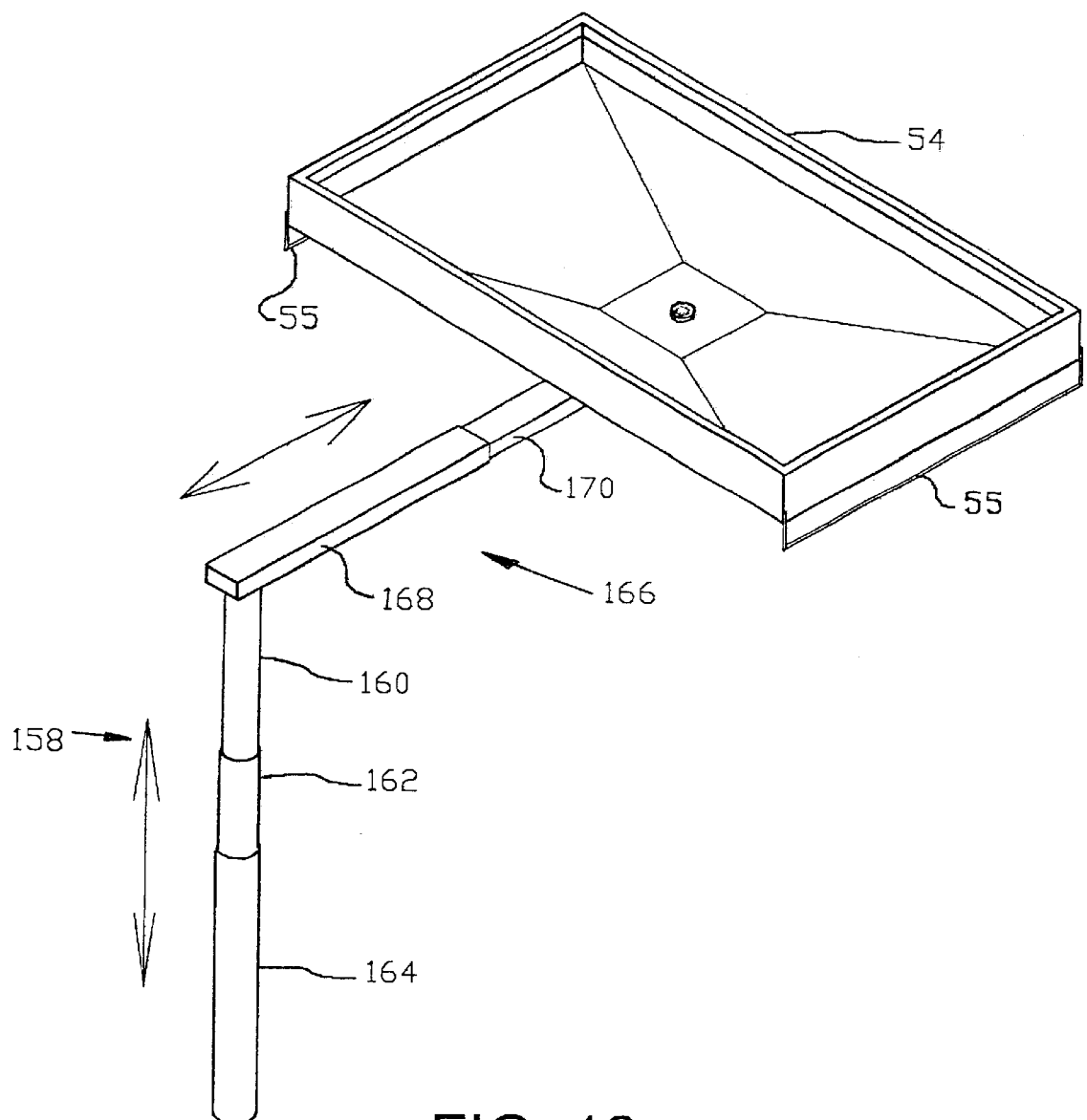
FIG. 12 is a perspective view of another preferred embodiment of an upright conduit, swing arm and tray assembly of the present invention.

Referring next to FIG. 12, another preferred embodiment of the invention is shown where upright conduit 158 is formed of a plurality of telescopic portions 160, 162 and 164. Actually, telescopic portion 164 could be the collar 108 as shown in FIGS. 1 and 2. If desired, friction clutches such as are shown in FIG. 9 could be used with telescopic portions 160, 162 and 164. FIG. 12 also shows another embodiment for a swing arm 166 that is formed of a plurality of telescopic portions 168, 170. Swing arm 166 could also be used in place of swing arm 52 on the embodiment shown in FIGS. 1 and 2.

Figure 13:
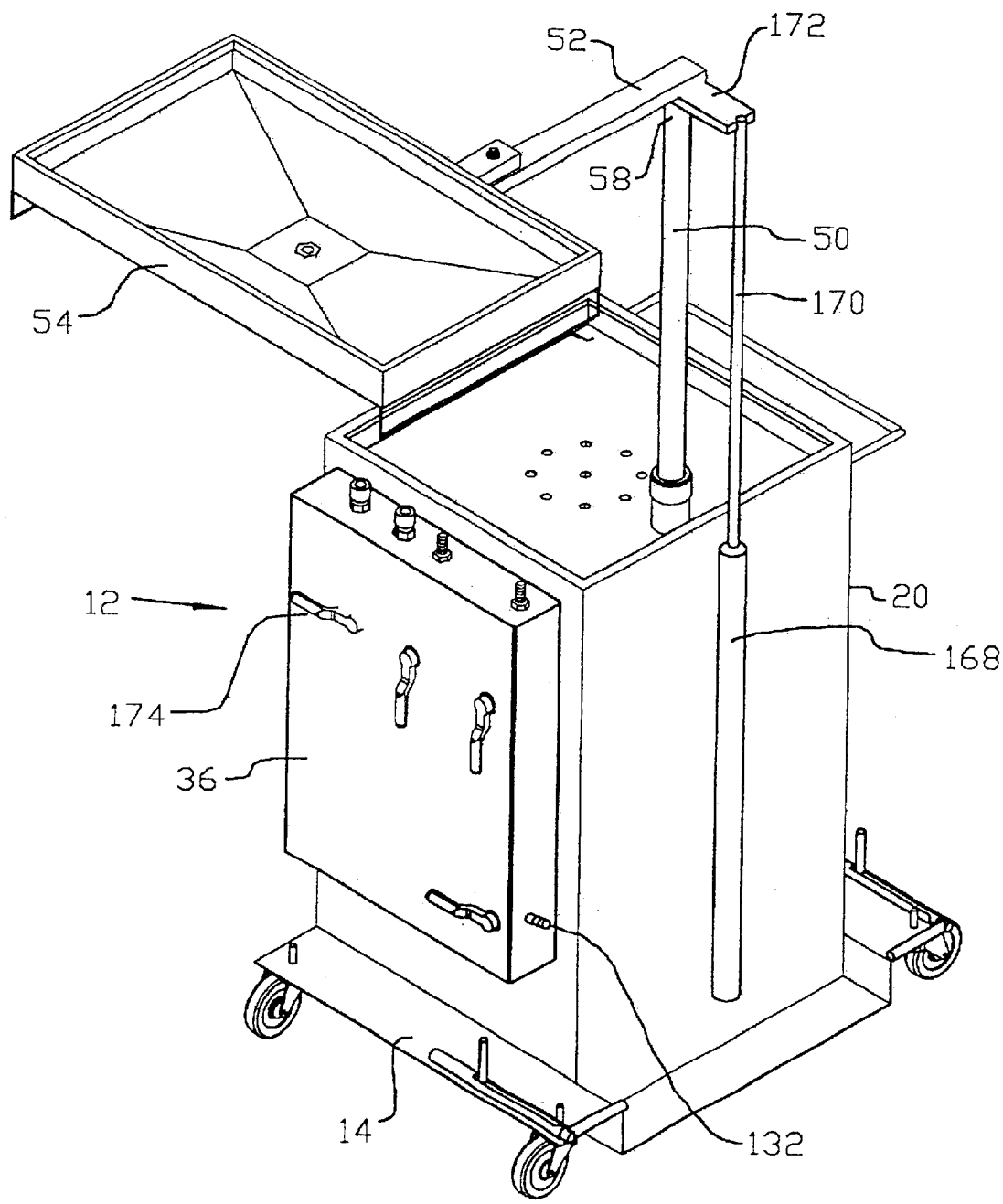
FIG. 13 is a perspective view of yet another preferred embodiment of the present invention showing a pneumatic cylinder to assist in lifting the tray.

FIG. 13 shows another preferred embodiment of the invention wherein a pneumatic cylinder 168 is used to assist in the raising and lowering of tray 52. Cylinder 168 has a piston 170 with an offset bracket 172 slidably mounted on the top inlet end portion 58 of upright conduit 50, so that conduit 50 can still rotate. Cylinder 168 is connected to the pneumatic air lines 136 and is operated through a pneumatic valve 174 mounted on side housing 36. If desired, cylinder 168 could be made to raise and lower automatically upon the respective opening and closing of cabinet access door 22.

A coil spring (not shown) mounted concentrically over upright conduit 50 could also be used in place of cylinder 168 to assist in the raising of tray 54. In this case, the tray would be pushed downwardly to any desired level, and friction clutch 120 would be used to hold tray 54 at the desired level. A mechanical latch (not shown) could be provided in place of friction clutch 120, and this latch could be connected so that it is released upon the opening of cabinet access door 22, to automatically raises tray 54 when access door 22 is opened.

Figure 14:
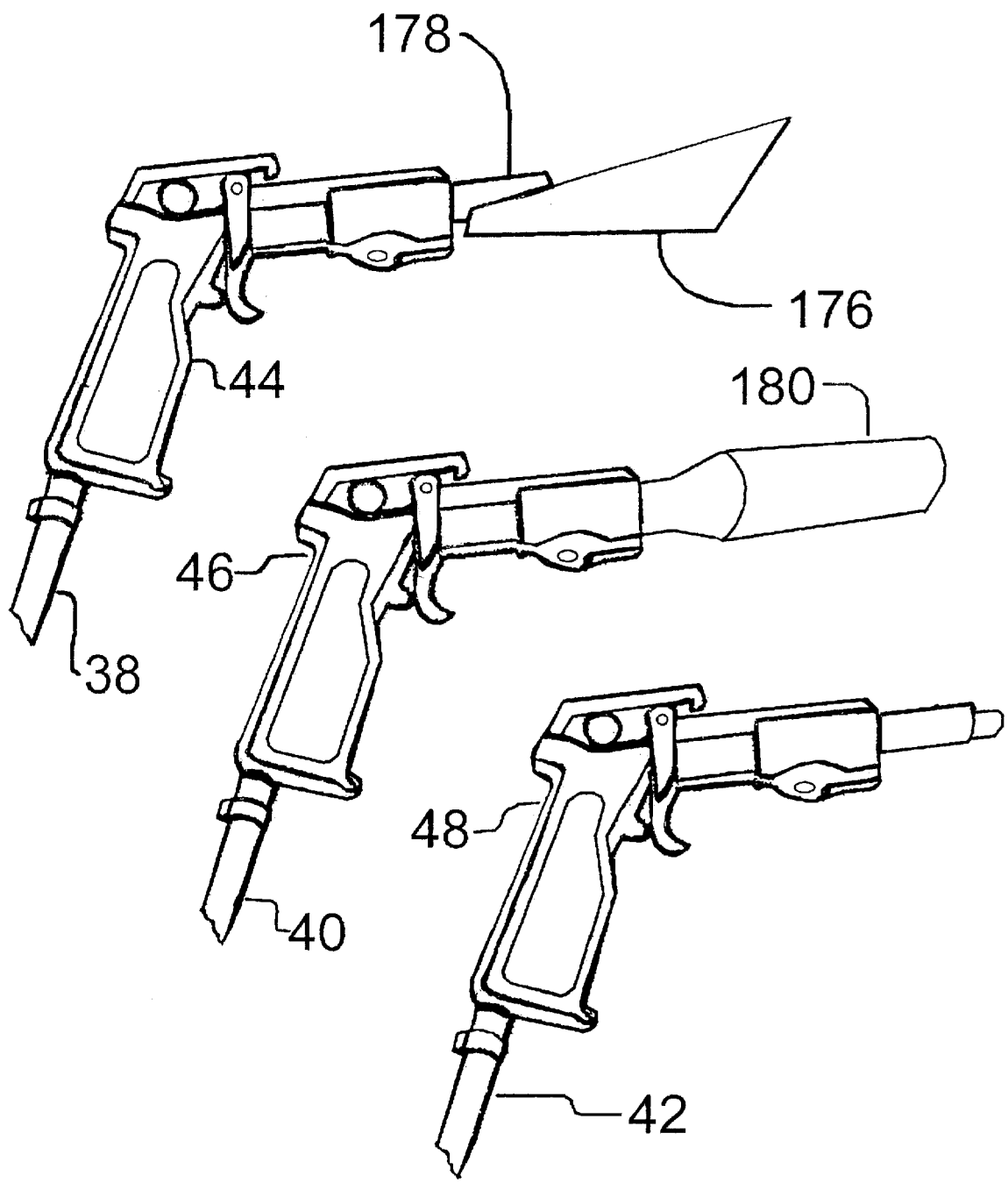
FIG. 14 is a perspective view of the trigger spray guns used in the present invention.

FIG. 14 shows air blow gun 48 and spray guns 44, 46. Spray gun 44 is a scraper gun and it has a scraper blade 176 mounted on a nozzle 178. Spray gun 46 has a flow-through brush 180 in place of a nozzle. Spray guns 44, 46 are made with special O-rings made from a material sold under the trade-mark VITON, but any suitable O-ring material could be used that would stand up to the solvents used in brake washer 10.

In operation, a drum or container 24 of cleaning fluid is placed inside cabinet 20 and pump inlet 28 is put into the cleaning fluid. A source of compressed air is connected to inlet fitting or coupling 132 and valve 134 is opened. This activates pump 128 to supply pressurized cleaning fluid through outlet line 149. One or both of the valves 150, 152 are opened to supply pressurized cleaning fluid to hoses 38, 40. It will be appreciated that the outlet ends of hoses 38 and 40 to which spray guns 44, 46 are attached extend above tray 54 to be able to spray fluid onto brake assemblies that are located above tray 54. Spray guns 44, 46 have triggers which activate pump 128 when pressed, pump 128 being pressure activated, or at least activated when the output pressure is reduced, such as when the spray gun triggers are pulled.

Cleaning fluid sprayed onto the brake parts being cleaned falls downwardly into tray 54 and then passes through hollow swing arm 52 or 166. This fluid then passes through upright conduit 50 or 158 to be returned to container 24.

Having described preferred embodiments of the invention, it will be appreciated that various modifications may be made to the structures described above. For example, only one cleaning fluid hose 38, 40 is required and compressed air hose 32 can be eliminated, if desired. The plumbing arrangement inside side housing 36 can be changed as desired. Instead of a replaceable cleaning fluid container 24, a fixed or permanent cleaning fluid tank or container could be used. Cabinet basin 30 could be eliminated. Tray 54 could be round or circular or some other shape or size. Other modifications will be apparent to those skilled in the art.

As will be apparent to those skilled in the art in the light of the foregoing disclosure, many alterations and modifications are possible in the practice of this invention without departing from the spirit or scope thereof. The foregoing description is of the preferred embodiments and is by way of example only, and is not to limit the scope of the invention.

What is claimed is:

1. Brake cleaning apparatus comprising:
    a base adapted to hold a container of cleaning fluid, the container having a top opening;
    an upright conduit telescopically mounted in the base, the conduit having a lower outlet end portion adapted to communicate with the container opening, and a top inlet end portion;
    a hollow swing arm attached to the conduit top inlet end portion to communicate therewith, the swing arm having a distal end portion defining an inlet opening;
    a tray having a sump portion defining an outlet opening, the tray being mounted on the swing arm distal inlet end portion with the tray outlet opening in communication with the swing arm inlet opening;
    a pump mounted on the base and having an inlet adapted to communicate with cleaning fluid in said container, the pump having an outlet;
    a cleaning fluid hose coupled to the pump outlet and having an outlet end adapted to extend above the tray; and means for activating the pump to supply cleaning fluid to said hose.

2. Brake cleaning apparatus as claimed in claim 1 wherein the swing arm is formed of at least two conduits located end-to-end with adjacent intermediate end portions, and including fluid-tight coupling means hingeably connecting the respective adjacent conduit intermediate end portions together.

3. Brake cleaning apparatus as claimed in claim 2 and further comprising a rotatable, fluid-tight coupling rotatably connecting the tray sump portion to the swing arm distal end portion.

4. Brake cleaning apparatus as claimed in claim 3 wherein the base includes a collar for slidably accommodating the upright conduit.

5. Brake cleaning apparatus as claimed in claim 4 and further comprising a friction clutch attached to the collar for locking the upright conduit in position.

6. Brake cleaning apparatus as claimed in claim 5 and further comprising a friction clutch attached to the collar for locking the upright conduit in position.

7. Brake cleaning apparatus as claimed in claim 1 and further comprising a rotatable, fluid-tight coupling rotatably connecting the tray sump portion to the swing arm distal end portion.

8. Brake cleaning apparatus as claimed in claim 7 wherein the base further comprises means defining a basin located above the fluid container, the basin having a lower sump portion defining an outlet opening communicating with the fluid container top opening.

9. Brake cleaning apparatus as claimed in claim 8 wherein the swing arm is formed of at least two conduits located end-to-end with adjacent intermediate end portions, and including fluid-tight coupling means hingeably connecting the respective adjacent conduit intermediate end portions together.

10. Brake cleaning apparatus as claimed in claim 1 wherein the base further comprises means defining a basin located above the fluid container, the basin having a lower sump portion defining an outlet opening communicating with the fluid container top opening.

11. Brake cleaning apparatus as claimed in claim 10 wherein the swing arm is formed of at least two conduits located end-to-end with adjacent intermediate end portions, and including fluid-tight coupling means hingeably connecting the respective adjacent conduit intermediate end portions together.

12. Brake cleaning apparatus as claimed in claim 11 wherein the upright conduit includes a plurality of telescopic portions.

13. Brake cleaning apparatus as claimed in claim 1 wherein the base includes a collar for slidably accommodating the upright conduit.

14. Brake cleaning apparatus as claimed in claims 13 wherein the swing arm is formed of at least two conduits located end-to-end with adjacent intermediate end portions, and including fluid-tight coupling means hingeably connecting the respective adjacent conduit intermediate end portions together.

15. Brake cleaning apparatus as claimed in claim 1 wherein the upright conduit includes a plurality of telescopic portions.

16. Brake cleaning apparatus as claimed in claim 1 wherein the swing arm is formed of a plurality of telescopic portions.

17. Brake cleaning apparatus as claimed in claim 1 wherein the base is in the form of a cabinet, and wherein the cabinet is adapted to hold a removable container of cleaning fluid therein, the cabinet including a plurality of casters for movement of the brake cleaning apparatus.

18. Brake cleaning apparatus as claimed in claim 17 wherein the cabinet further comprises means defining a basin located above the fluid container, the basin having a lower sump portion defining an outlet opening communicating with the fluid container top opening.

19. Brake cleaning apparatus as claimed in claim 1 wherein the cleaning fluid hose is a first cleaning fluid hose, and further comprising at least an additional cleaning fluid hose coupled to the pump outlet.

20. Brake cleaning apparatus as claimed in claim 19 and further comprising compressed air inlet and outlet couplings mounted in the base in fluid communication with each other, and a compressed air hose coupled to said outlet coupling, said hose having an outlet adapted to extend above the tray.

21. Brake cleaning apparatus as claimed in claim 19 and further comprising trigger-operated spray guns connected to the cleaning fluid hoses.

22. Brake cleaning apparatus as claimed in claim 19 and further comprising flow control valves coupled between the pump outlet and the respective cleaning fluid hoses for individual flow control through the cleaning fluid hoses.

* * * * *